United States Patent Office 3,481,792
Patented Dec. 2, 1969

3,481,792
UNCHARGED DRY CELLS WITH A BIUREA DEPOLARIZER
Stanley Myron Davis and Charlotte Marie Kraebel, Somerville, and Richard Alfred Parent, Piscataway Township, Middlesex County, N.J., assignors to American Cyanamid Company, Stamford, Conn., a corporation of Maine
No Drawing. Continuation-in-part of application Ser. No. 529,475, Feb. 23, 1966. This application Dec. 11, 1967, Ser. No. 689,258
The portion of the term of the patent subsequent to Dec. 12, 1984, has been disclaimed
Int. Cl. H01m 35/00, 15/00
U.S. Cl. 136—137                    8 Claims

ABSTRACT OF THE DISCLOSURE

Secondary dry cells for electric storage batteries which have a long shelf life in the uncharged condition and improved cycle life, particularly on deep discharge, are provided by using a substituted biurea as the depolarizer precursor. Preferred cells have a zinc anode with an electrolyte containing zinc and ammonium chlorides and bromides, and a mercury salt, such as mercuric chloride, as a cycle life extender, and a metallic oxide, such as zinc oxide or barium oxide, for pH control.

Cross reference to related applications

This application is a continuation-in-part of Davis, Kraebel, and Patent application, Serial Number 529,475, filed February 23, 1966, "Dry Cells," now Patent Number 3,357,865, dated December 12, 1967, which discloses the use of 1,1'-azobis(N-substituted formamides) in primary and secondary cells as depolarizers.

Summary of the invention

This invention relates to improved electric secondary battery cells containing substituted biureas as an organic depoarizer precursor.

Electric batteries or cells are devices that convert chemical energy into electrical energy, and include primary and secondary cells. Primary cells convert chemical energy to electrical energy by an electrochemical process. Generally, the term "primary cell" refers to the type of cell that is discarded after the chemical energy is converted to electrical energy; that is to say, the chemical reactions involved are not reversible in a practical sense. Primary cells which are manufactured in such a way that no large excess of liquid electrolyte is required are referred to as dry cells. Secondary cells utilize easily reversible chemical reactions and therefore are rechargeable and can be used repeatedly.

Cells consist of a negative electrode, called the anode, usually of a metal such as zinc, magnesium, aluminum, cadmium, etc., and certain alloys in which at least one of these metals constitutes a majority of the composition, and a positive electrode, called the cathode. The cathode consists of a conductive material such as carbon, a depolarizer which is an inorganic or organic oxidant, and an electrolyte. Ionic contact between cathode and anode is necessary, but electronic contact must be avoided. In some cells electronic contact is avoided by the nature of the materials involved, i.e., highly insoluble, while in other cells separators are employed.

The individual cells in common use deliver 1.0 to 1.6 volts. When greater voltages are required, appropriate combinations of individual cells are employed. It is desirable that:

(1) Batteries deliver the desired voltage at a fairly constant level for a long period of time and have a high ampere-hour capacity,
(2) The batteries be inexpensive,
(3) The materials of their manufacture be available, and
(4) They have a reasonable size and weight relative to the power obtainable therefrom.

It is also desirable that the battery have a relatively high and flat operating voltage curve over a wide range of current drains.

The most common and least expensive primary battery, known as the Leclanche cell, employs manganese dioxide as the depolarizer in combination with a zinc anode and a zinc chloride-ammonium chloride electrolyte solution. This battery is inefficient as a secondary cell and has the deficiency of rapid polarization.

A large number of substitutes for manganese dioxide as depolarizer in the Leclanche cell have been proposed. There has been a continuing need for improved depolarizers for secondary cells that result in improved battery characteristics.

This invention is based on the discovery that compounds of the substituted biurea type, when used as depolarizers in cells, produce cells of excellent discharge characteristics, while overcoming many of the deficiencies of conventional cell depolarizers. These depolarizers are substituted biureas of the formula

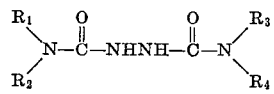

where $R_1$, $R_2$, $R_3$, and $R_4$ may be hydrogen, alkyl of 1 to 8 carbon atoms, mono- and dicarbocyclic aryl or substituted aryl, cycloalkyl, aralkyl, alkoxyalkyl, cyanoalkyl, haloalkyl, nitroalkyl, alkenyl, and where $R_1$ and $R_2$ and/or $R_3$ and $R_4$, when alkyl, may be joined together through a nitrogen, sulfur, or oxygen linkage to form a heterocyclic ring, and not more than three of $R_1$, $R_2$, $R_3$, and $R_4$ are hydrogen.

Thus, it has been found possible, for the purposes of this invention, to use the substituted biureas in depolarizer systems in cells, whether the organic compounds are substituted symmetrically, unsymmetrically, or contain a heterocyclic ring.

The structures which are preferred are those wherein each of the two nitrogen atoms carries as the only substituent an alkyl radical of 3 to 5 carbon atoms. Symmetrical compounds are often more economically available, but symmetry is not essential.

Although to act as a depolarizer, the compound must be in an oxidized form, the depolarizer itself being reduced during cell discharge, the term depolarizer will be herein used to include the compound in the reduced form, as it is introduced in an uncharged cell, and which is itself oxidized during charging, so as to be an oxidizer during discharge. In the present cells, the substituted biurea is converted to the corresponding azobisformamide by dehydrogenation (oxidation) to form the azo linkage during charging and reconverted to the substituted biurea form during discharge of the cell. The equation may be summarized

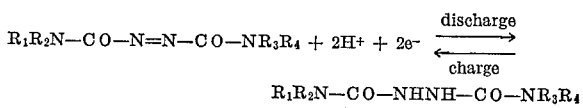

The depolarizer can be spoken of as a depolarizer system to include both forms.

It is unsual to provide cells of the dry cell type in a discharged condition, to be charged only near to the time of usage, but the unusual stability in the discharged condition, and the rechargeability after deep discharge render this new concept in cell design both useful and unexpected.

Among the useful substituted biureas of this invention are included:

1,6-dimethylbiurea
1,1,6,6-tetramethylbiurea
1,6-diethylbiurea
1,6-di-n-propylbiurea
1,6-diisopropylbiurea
1,6-di-n-butylbiurea
1,6-diisobutylbiurea
1,6-di-sec.-butylbiurea
1,6-di-tert.-butylbiurea
1,6-di-n-octylbiurea
1,2-bis(piperidinocarbonyl)hydrazine or
  [1,1,6,6-bis(pentamethylene)biurea]
1,2-bis(morpholinocarbonyl)hydrazine or
  [1,1,6,6-bis(oxydiethylene)biurea]
1,2-bis(pyrrolidinylcarbonyl)hydrazine or
  [1,1,6,6-bis(tetramethylene)biurea]
1,2-bis(1-piperazinylcarbonyl)hydrazine or
  [1,1,6,6-bis(iminodiethylene)biurea]
1,6-diphenylbiurea
1,6-bis(3-chlorophenyl)biurea
1,6-bis(p-tolyl)biurea
1,6-bis(p-xylyl)biurea
1,6-bis(2-naphthyl)biurea
1,6-bis(2-chlorophenyl)biurea
1,6-bis(4-methoxyphenyl)biurea
1,6-bis(3-nitrophenyl)biurea
1,6-bis(4-dimethylaminophenyl)biurea
1,1,6,6-tetraisopropylbiurea
1,1,6,6-tetrabutylbiurea
1-ethyl-6-methylbiurea
1-hexyl-6-methylbiurea
1-(methylcarbamoyl)-2-(1-pyrrolidinylcarbonyl)hydrazine or [1-methyl-6,6-(tetramethylene)biurea]
1-(methylcarbamoyl)-2-(morpholinocarbonyl)hydrazine or [1-methyl-6,6-(oxydiethylene)biurea]
1,6-bis(2-cyanoethyl)biurea
1,6-bis(3-methoxypropyl)biurea
1,6-bis(4-chlorobutyl)biurea
1,6-diallylbiurea
1-ethyl-6-(p-methoxyphenyl)biurea
1-n-pentyl-6-n-propylbiurea [1-n-amyl-6-n-propylbiurea]
1-methyl-6-phenylbiurea
1-n-butyl-6-methylbiurea
1-(p-ethylphenyl)-6-methylbiurea
1-methyl-6-(1-naphthyl)biurea
1-ethyl-6-n-propylbiurea
1-ethyl-6-n-hexylbiurea Mixtures of these biureas may be used in cells, as well as the compounds individually.

By adding an oxide such as zinc oxide, barium oxide or magnesium oxide, to react with acid which may be formed, the substituted azobisformamides for the charged cells are formed in situ in the cell by adding the corresponding substituted biurea, and oxidizing by charging the cell.

A higher drain rate is obtainable if the substituted biurea is finely divided. Good cells result using a particle size range of 20 to 40 microns or smaller. Subdividing to about 1 micron permits a higher drain rate. The larger surface area is preferred also for the more insoluble biureas. The smaller size is obtainable by grinding, or by crystallizing under conditions which yield smaller crystals.

The biureas are used in the cathodic mix in the range of from 10% to 50% of the total weight of the cathodic mix. The cathodic mix additionally contains electrolyte solution and carbon black in any of its various forms, such as graphite, acetylene black, or high surface area carbon, preferably of over 200 square meters per gram, or other known forms of carbon black.

The electrolyte solution itself may be an aqueous solution containing a soluble salt, such as sea water, or water to which one or more soluble salts have been added. Halide salts or mixtures of halide salts containing cations such as ammonium and metals such as zinc, are the preferred soluble salts in the electrolyte. The electrolyte may be prepared by dissolving the salt in water at a concentration of between 30 grams per liter and that producing a saturated solution at ordinary temperatures. The concentration does not appear to be especially critical, although for best results certain concentrations are preferred depending upon the particular salt or combination of salts that are used.

For cells of this invention a combination of 170 grams of zinc chloride and 270 grams of ammonium bromide per 1000 grams of solution has been found especially useful. Bromide-containing mixtures are preferred in our secondary cells in that their use tends to overcome undesirable effects resulting from overcharging.

The anode of the batteries of the present invention is zinc in pure or alloyed form.

The cells are frequently cylindrical, and of standard sizes, to fit electrical equipment. Flat, rectangular, button, or other shapes of cells may be made using the present cell compositions. The size and shape are determined by capacity requirements, and space available. Preferably, but not necessarily, the cells will have a conventional size to fit standard size flashlights, radios, recorders, emergency exit lights, etc.

Satisfactory results are obtained using conventional type separators such as kraft paper; kraft paper coated or impregnated with starch or other gel-like material such as carboxymethyl cellulose and/or cereal paste; vegetable parchment and the like. Superior results are achieved if a laminated cellophane separator is used. This separator may be described in somewhat more detail as a laminate of a film of small pore size (such as cellophane with an average pore diameter of 16 A.) with a cellulosic paper of high water retention properties which may have as an adhesive a material such as gum arabic. Other films such as porous nylon, polyester films, polyolefin films, polyacrylate films, poly(vinylacetate) films, or poly(vinylchloride) films, and other low porosity films, having pore sizes in the range of 5 to 40 angstrom units are useful. The pores must permit ions to pass readily and inhibit diffusion of other materials.

Although it is not necessary for producing a useful rechargeable cell, the use of this laminated cellophane type separator results in considerable improvement in the cycling characteristics of the cell. Thus, using a regular porous kraft paper separator (or one which is impregnated with starch or carboxymethyl cellulose or composed of porous nylon, vegetable parchment, etc.). The cells normally give satisfactory performance through at least 10 charge-discharge cycles. Using the cellophane laminate separator, the cell is normally satisfactory through up to 40 or more cycles. Thus, although not actually necessary, the cellophane laminate type separator is definitely preferred for superior performance in these cells.

From 0.01% to 1.0% of a salt of mercury, either mercuric or mercurous, and conveniently mercuric chloride, in the cell gives an amalgamation on the zinc anode, with an equipotentialization, and improved corrosion resistance. Importantly, and unexpectedly, the mercury salt gives a major increase in rechargeability. A lifetime of a larger number of useful cycles and over a longer period of time results.

The invention will be further illustrated by the hereinafter presented examples. It is to be understood, however, that these examples are presented as illustrative only and that it is in no way intended to limit the invention thereto.

Example 1

An "AA" size cell was prepared using a zinc can, a cellophane laminate having a pore size of around 16 angstroms, and a cathodic mix containing: 1.5 grams of 1-methyl-6-butylbiurea; 1 gram of carbon black, surface area 1300 sq. meters per gram; 0.66 gram of zinc oxide; 3.5 ml. electrolyte containing: 35% $ZnCl_2$, 20% $NH_4Cl$, 0.3% $HgCl_2$, 44.7% $H_2O$. The zinc can was lined with the laminate as a separator with the laminate extending about ¼ inch above the can. The above cathodic mix was tamped into the cell. A carbon rod having a brass cap was inserted into the mix. The laminate was folded over the top of the cathodic mix and the cell sealed with epoxy resin.

The cell was charged for 16 hours at 20 milliamperes; then discharged through a 20 ohm-resistor until the voltage dropped to 0.96 volt. The cell was then charged at 20 milliamperes until the voltage reached 1.65. The cell performed satisfactorily for 4 cycles, at which time the test was discontinued.

The substituted biurea was used as a starting material with N-n-butyl-N'-methyl-1,1'-azobisformamide being synthesized in the cell by the use of the charging current. Corresponding biureas can be used as a source for other azobisformamides, with the cells being charged to produce the azobisformamides either at the time of manufacture, or other convenient time prior to use.

Example 2

A cell was prepared as in Example 1 using the following cathodic charge: 0.99 g. of 1,6-di-n-butylbiurea, 0.99 g. of Columbian Carbon Co. SA40–220 carbon black, 0.54 g. of zinc oxide, 2.9 ml. of electrolyte (17% $ZnCl_2$, 27% $NH_4Cl$, 0.3 $HgCl_2$, 55.7% $H_2O$), with a cellophane laminate as separator and a zinc can as anode.

The cell was charged at a constant potential of 1.80 volts for 8 hours, taking up 85% of the charge theoretically possible. The cell was discharged through a 5.1 ohm resistor with an efficiency of 85%.

After 11 such charge and discharge cycles, the cell was still functioning efficiently and the test was terminated.

Example 3

Cells were constructed using an "AA" size zinc can, a cellophane laminate as separator, and a cathodic mix of: 1.00 gram of 1,1'-azobis(N-n-butylformamide), 1.00 gram of carbon black (Columbian SA40–220), 3.0 ml. of electrolyte—17% $ZnCl_2$, 27% $NH_4Cl$, 0.3% $HgCl_2$, 55.7% $H_2O$. Two cells were constructed, otherwise identical, but with different particle size of the 1,1'-azobis(N-n-butylformamide) depolarizer. The cells were tested by discharging through a circuit having a resistance of 5.3 ohms. The efficiency was measured to two different cut-off voltages with the following results:

| Particle size range | Efficiency to— | |
|---|---|---|
| | 1.0 volt cut-off, percent | 0.8 volt cut-off, percent |
| 4 to 10 microns | 67 | 88 |
| 30 to 100 microns | 55 | 71 |

The finer particle size gives much better results. The relative values will depend in part on the distribution in the size range, and the discharge rates. The relative improvement of the smaller particles is greater at higher drain rates, through lower resistances.

Similar results are obtained by using 1,6-di-n-butylbiurea in the same type cell, and the same particle size, with about 0.54 gram of zinc oxide in the cathode mix, and charging to form the 1,1'-azobis(N-n-butylformamide) in situ.

We claim:

1. In an uncharged dry cell comprising in combination a zinc anode and a cathode composition comprising a mixture of carbon, a depolarizer compound and an electrolyte, the improvement wherein the depolarizer compound has the formula:

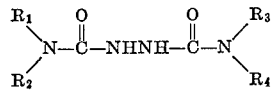

in which $R_1$, $R_2$, $R_3$ and $R_4$ are selected from the group consisting of hydrogen, alkyl of 1 to 8 carbon atoms, mono- and dicarbocyclic aryl, and substituted aryl, cycloalkyl, aralkyl, alkoxyalkyl, cyanoalkyl, haloalkyl, nitroalkyl, alkenyl, $R_1$ and $R_2$ and/or $R_3$ and $R_4$, when alkyl may be joined directly or through a nitrogen, sulfur or oxygen atom to form a heterocyclic ring, and not more than three of $R_1$, $R_2$, $R_3$ and $R_4$ are hydrogen, and the cathode composition contains a metallic oxide selected from the group consisting of barium oxide and zinc oxide.

2. The cell of claim 1, in which the cathode composition contains a bromide salt in the electrolyte.

3. The cell of claim 1, in which in the depolarizer compound $R_1$ and $R_3$ are hydrogen.

4. The cell of claim 3, in which, in the depolarizer compound $R_2$ and $R_4$ are propyl.

5. The cell of claim 3, in which, in the depolarizer compound $R_2$ and $R_4$ are butyl.

6. A cathode composition for use in an uncharged dry cell which comprises a mixture of carbon, an electrolyte, a depolarizer compound having the formula:

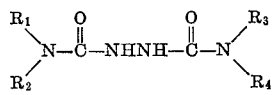

in which $R_1$, $R_2$, $R_3$ and $R_4$ are selected from the group of hydrogen, alkyl of 1 to 8 carbon atoms, mono- and dicarbocyclic aryl, and substituted aryl, cycloalklyl, aralkyl, alkoxyalkyl, cyanoalkyl, haloalkyl, nitroalkyl, alkenyl, $R_1$ and $R_2$ and/or $R_3$ and $R_4$, when alkyl may be joined directly of through a nitrogen, sulfur or oxygen atom to form a heterocyclic ring, and not more than three of $R_1$, $R_2$, $R_3$ and $R_4$ are hydrogen, and a metallic oxide selected from the group consisting of barium oxide and zinc oxide.

7. The cathode composition of claim 6 which contains a bromide salt in the electrolyte, and the metallic oxide is zinc oxide.

8. The cathode composition of claim 7 in which, in the depolarizer compound $R_2$ and $R_4$ are butyl.

References Cited

UNITED STATES PATENTS

| 3,040,114 | 6/1962 | Huber | 136—83 |
| 3,357,865 | 12/1967 | Davis et al. | 136—137 |

WINSTON A. DOUGLAS, Primary Examiner

D. L. WALTON, Assistant Examiner

U.S. Cl. X.R.

136—6